United States Patent [19]

Careglio et al.

[11] 4,219,071

[45] Aug. 26, 1980

[54] AIR-CONDITIONING SYSTEM FOR RAILROAD VEHICLES

[75] Inventors: Giuseppe Careglio; Ettore Restori; Marcello Pecorini, all of Turin, Italy

[73] Assignee: WABCO Westinghouse S.p.A., Turin, Italy

[21] Appl. No.: 909,884

[22] Filed: May 26, 1978

[51] Int. Cl.² .............................................. B60H 3/04
[52] U.S. Cl. ....................................... 165/23; 165/42; 62/215; 62/228; 318/334
[58] Field of Search ...................... 62/186, 215, 228 B, 62/236, 239, 23; 165/41, 59, 42, 43; 98/3, 4, 5; 318/334; 363/124, 131

[56] References Cited

U.S. PATENT DOCUMENTS

| 2,203,814 | 6/1940 | Clements | 165/42 |
| 2,256,350 | 9/1941 | Nystrom | 165/42 |
| 2,355,040 | 8/1944 | Alexander et al. | 165/43 |
| 3,237,545 | 3/1966 | Gillick et al. | 62/239 |
| 3,803,472 | 4/1974 | Konrad | 363/124 X |
| 3,870,945 | 3/1975 | Pedersen et al. | 363/124 X |
| 4,085,594 | 4/1978 | Mayer | 62/183 X |
| 4,107,941 | 8/1978 | Hamilton | 62/186 |

FOREIGN PATENT DOCUMENTS 2457999  6/1976  Fed. Rep. of Germany .......... 318/334

Primary Examiner—Albert W. Davis
Assistant Examiner—Margaret A. Focarino
Attorney, Agent, or Firm—G. J. Falce; R. W. McIntire, Jr.

[57] ABSTRACT

An air-conditioning system in which a static inverter is driven at a predetermined constant frequency during a normal service mode of vehicle operation to effect operation of the vehicle cooling and/or heating unit such as to maintain the interior temperature of the vehicle within a chosen comfort zone. During initial start-up, when the interior temperature reaches extreme proportions due to the vehicle sitting in the sun or cold, an abnormal service mode of operation is called for in which the static converter is driven at an increased frequency and voltage for a predetermined limited time to rapidly bring the interior temperature within the comfort zone. The so-called abnormal service mode of operation may be indicated manually by the train service personnel under extreme temperature conditions after the start-up period of abnormal service mode has expired. Also provided is a passenger load sensing arrangement to increase the ventilation capacity of the cooling unit fans when overcrowding exists.

13 Claims, 6 Drawing Figures

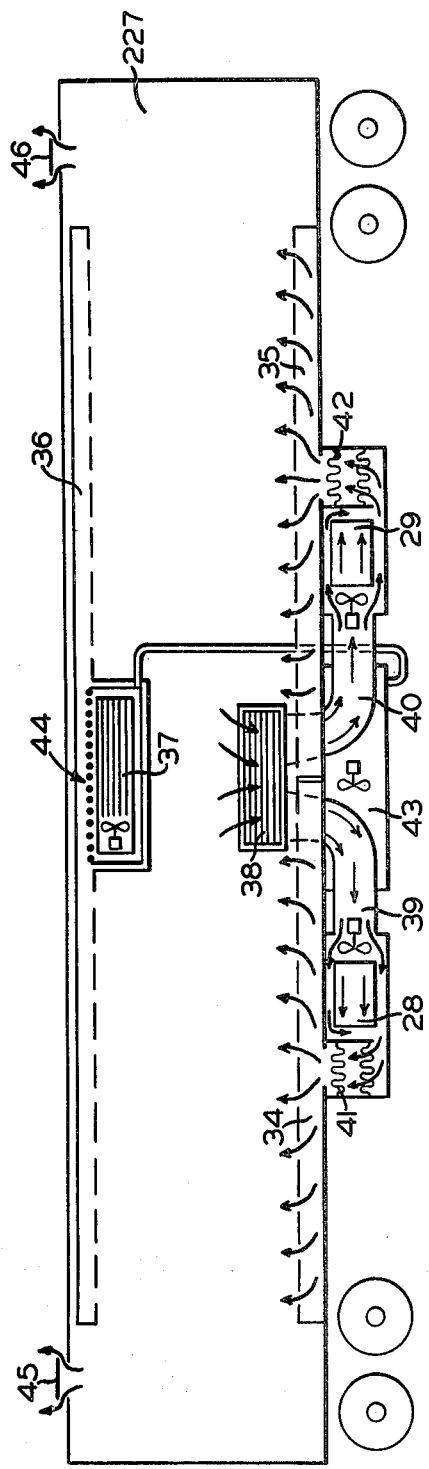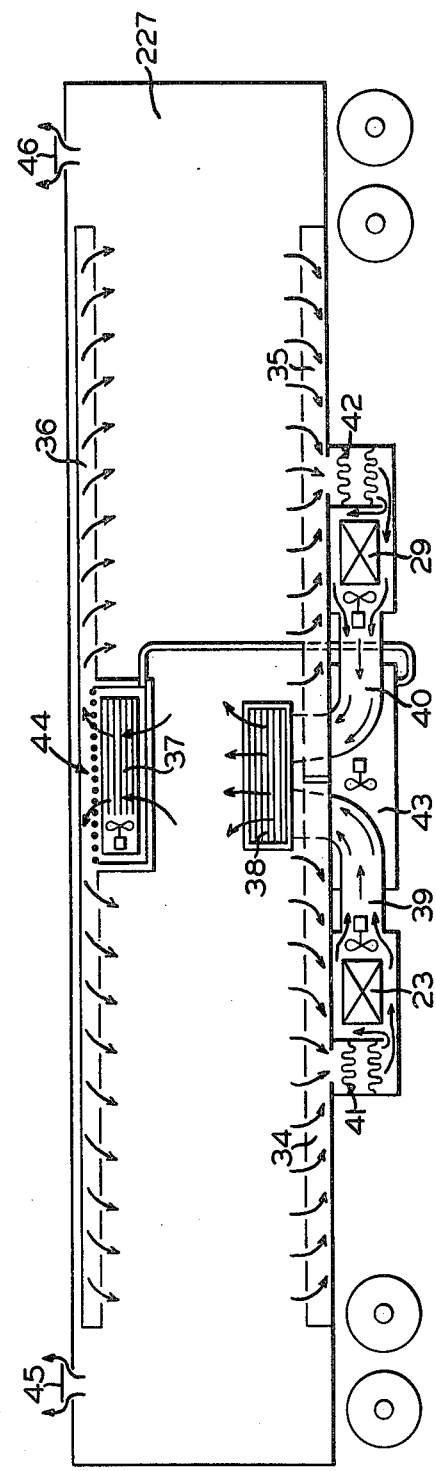

AIR-CONDITIONING SYSTEM FOR RAILROAD VEHICLES

BACKGROUND OF THE INVENTION

The present invention relates to air-conditioning systems for railway vehicles used in passenger service and more particularly to such systems in which a static converter is employed to provide power for operating the system equipment from the high voltage line of an electrified railway network.

The performance of conventional air-conditioning systems of the above type is determined by the maximum power level available and the exchange capacity of the cooler. This air exchange capacity must be such as to accomodate a fully occupied car.

When placing the car in service prior to departure, the car must be precooled or preheated to bring the inside temperature of the car within the specified temperature range selected for passenger comfort.

It becomes obvious, therefore, that a direct correlation exists between the maximum performance of the system and the conditions of comfort capable of being attained. For example, there may be cases of overcrowding of passengers or, due to tight scheduling, insufficient time to sufficiently carry out the precooling or preheating necessary to assure immediate passenger comfort. Particularly, extreme temperatures of the ambient air has an adverse affect upon the conditioning ability of the equipment and thus upon passenger comfort.

SUMMARY OF THE INVENTION

It is an object of the present invention, therefore, to provide an air-conditioning system capable of eliminating the aforesaid disadvantages of known systems by improving its overall efficiency.

Another object of the invention is to reduce the amount of fouling of the filters used in assuring a clean air intake.

With a view toward fulfilling these objectives, there is provided means for regulating and controlling a static converter comprising the system power supply unit, such as to vary its output frequency. This results in the electric fans providing a variable air supply, as well as the compressor of the cooling equipment being able to meet the heat energy as needed to obtain the proper degree of vehicle comfort. In so doing, the operational conditions of the static converter are freed from the nominal value of the frequency; hence, enabling the electric motors of the system to run at variable speeds. This makes it possible to adapt the supply of conditioned air to the existing energy requirements by increasing it under peak load conditions and reducing it as the demand diminishes.

Further, the electrical resistances of the heater unit are fed from the alternating current delivered by the static converter, which is influenced by the regulating and controlling means to vary the amplitude of its output voltage thereby adjusting the heater unit, as well as the power of the compressor to the prevailing energy requirements needed to provide passenger comfort.

From the foregoing, it is possible to obtain a reduction in the time required to preheat and precool the vehicle and an improvement in the overall performance of the system.

BRIEF DESCRIPTION OF THE DRAWINGS

The objectives and advantages of the invention will become apparent from the following description when taken with the accompanying drawings in which:

FIGS. 5 and 6 show an application of the unit of FIG. 1 under two different operational conditions.

DESCRIPTION AND OPERATION

Figure 1:
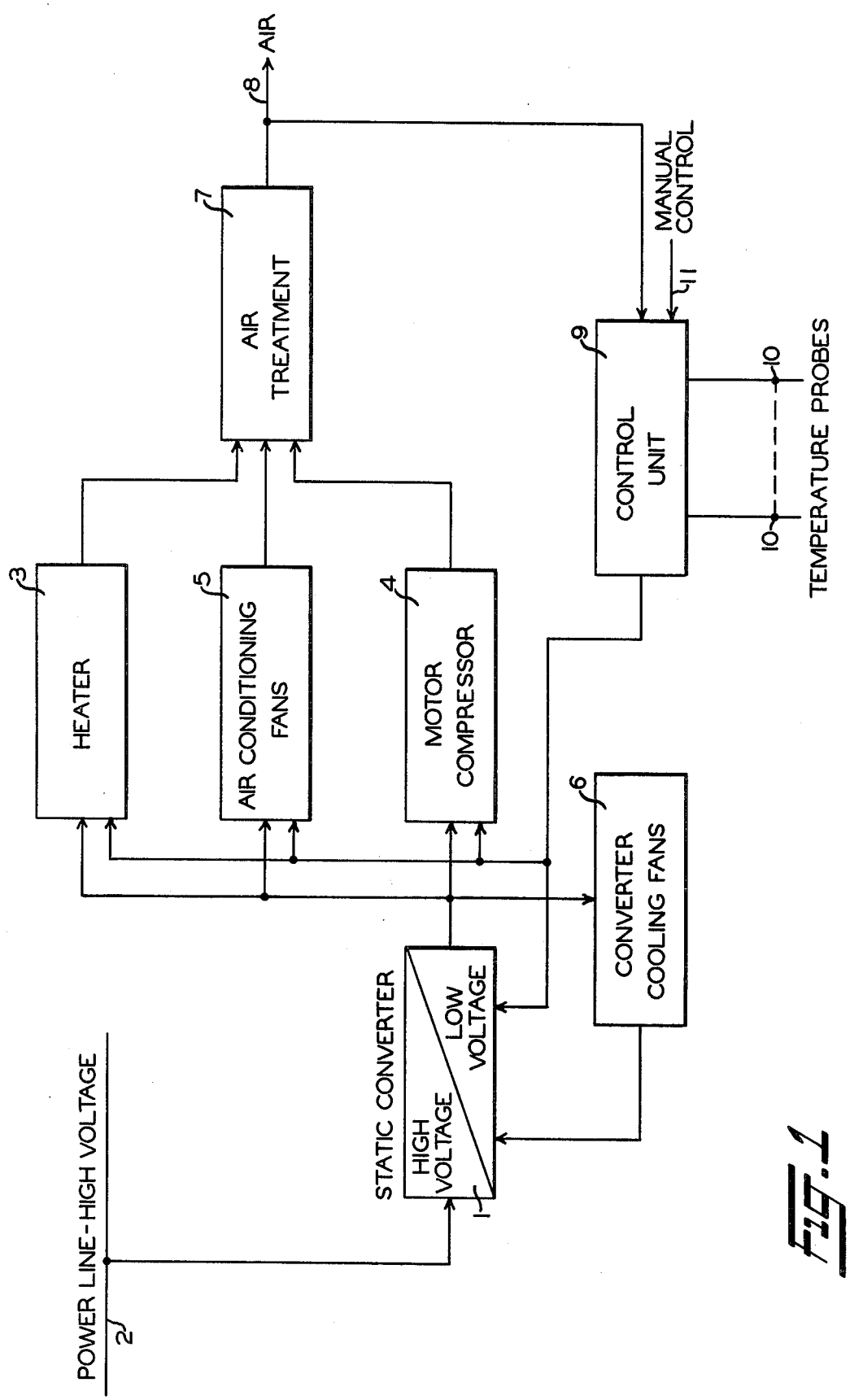
FIG. 1 shows a block diagram of an air conditioning unit for a railway passenger vehicle.

The air-conditioning system shown in FIG. 1 comprises a static converter 1, which receives power from the high voltage line 2 of the vehicle, which is in turn supplied from the catenary through the pantograph of the locomotive.

The output of the static converter 1 is connected with the various power consuming units and in particular with the heater 3, which provides the heating of the vehicle; with the motor compressor 4, which provides the cooling of the air circulating in the vehicle; with the electric fans 5 of the air-conditioning unit, which under any circumstances supply all the air circulating in the vehicle, and with the electric fans 6, which provide the forced cooling of the static converter 1.

The outputs of the heater 3 and the motor compressor 4 are injected into the circulating air supplied by the fans 5 of an air-treatment unit 7, whose output 8 supplies the treated air admitted into the vehicle.

The operation of the parts just described is controlled by a control unit 9, which actuates in a coordinated manner the static converter, the other component parts of the airconditioning installation and the fans of the converter.

In particular, the converter 1 delivers energy in a three-phase alternating current, with voltage and frequency parameters which can be controlled within a certain range as a function of the requirements of the whole system, in accordance with the demands made by the control unit 9 through a plurality of temperature probes 10 that sense the energy requirements of the vehicle.

The control unit 9 initiates operation of the equipment at a maximum capacity compatible with the characteristics of the system (for instance, with an increase in voltage and frequency values on the order of 20% with respect to the nominal values) by supplying the maximum cooling (or heating) energy over a predetermined time, so as to make it possible to obtain a forced precooling (or preheating) over greatly reduced times as compared with those obtainable with the conventional installations. The condition of maximum capacity is limited by means of a suitable timing device in the unit 9 or by interposing a temperature regulator which indicates the anticipated attainment of the state of equilibrium of the thermal conditions.

The control unit 9 simultaneously influences the static converter 1 and the air-conditioning unit in such a manner that an increase in output voltage and frequency of the converter corresponds to the increased demand for power to the compressor (or heater). As a result, in addition to the increase in power supplied to the compressor (or heater), there is obtained via fans 5 an increase in the supply of treated air needed for the vehicle, thus speeding up the "washing" of its total volume, and an increase in the supply of air which cools the condenser and which makes it easier to transfer the calories present in the coolant to the outside. Moreover, an increase in the supply of cooling air is provided to force cool the static converter via fans 6, since in this phase the converter is operating under a maximum load.

The operation so coordinated by the control group represents a special feature of the air-conditioning system which forms the subject of the invention, wherein all the component parts cooperate in a coherent manner in an accelerated precooling or preheating of the coach.

A similar performance can be obtained, under conditions of overcrowding in the vehicle, by means of a manual control 11, which actuates the unit 9 and can be operated by the service personnel of the train; such an operation makes it possible to recreate more comfortable conditions in a vehicle in which there may have arisen a situation which is unsatisfactory from the viewpoint of passenger comfort.

In the absence of these extreme conditions requiring peak operation of the equipment, the system is made to operate, by the control unit 9, in a lower operating range, resulting in less power supplied by the converter, less treated air circulation, and less ventilation of the converter.

Under such normal conditions, noise is reduced to within specified limits, all mechanical wear is greatly reduced and the degree of fouling of the filters inserted in the air ducts is proportionally reduced as well. In all the air circuits, the load losses prove to be less and the overall performance of the air-conditioning installation improves. Hence, for all of the aforesaid reasons, the total performance of the system consisting of the power supply unit, the respective cooling fans and the air-conditioning installation improves.

All the advantages mentioned can be obtained with the present system with respect to the structure of the control unit 9 and the functions which the control unit is capable of performing.

Figure 2:
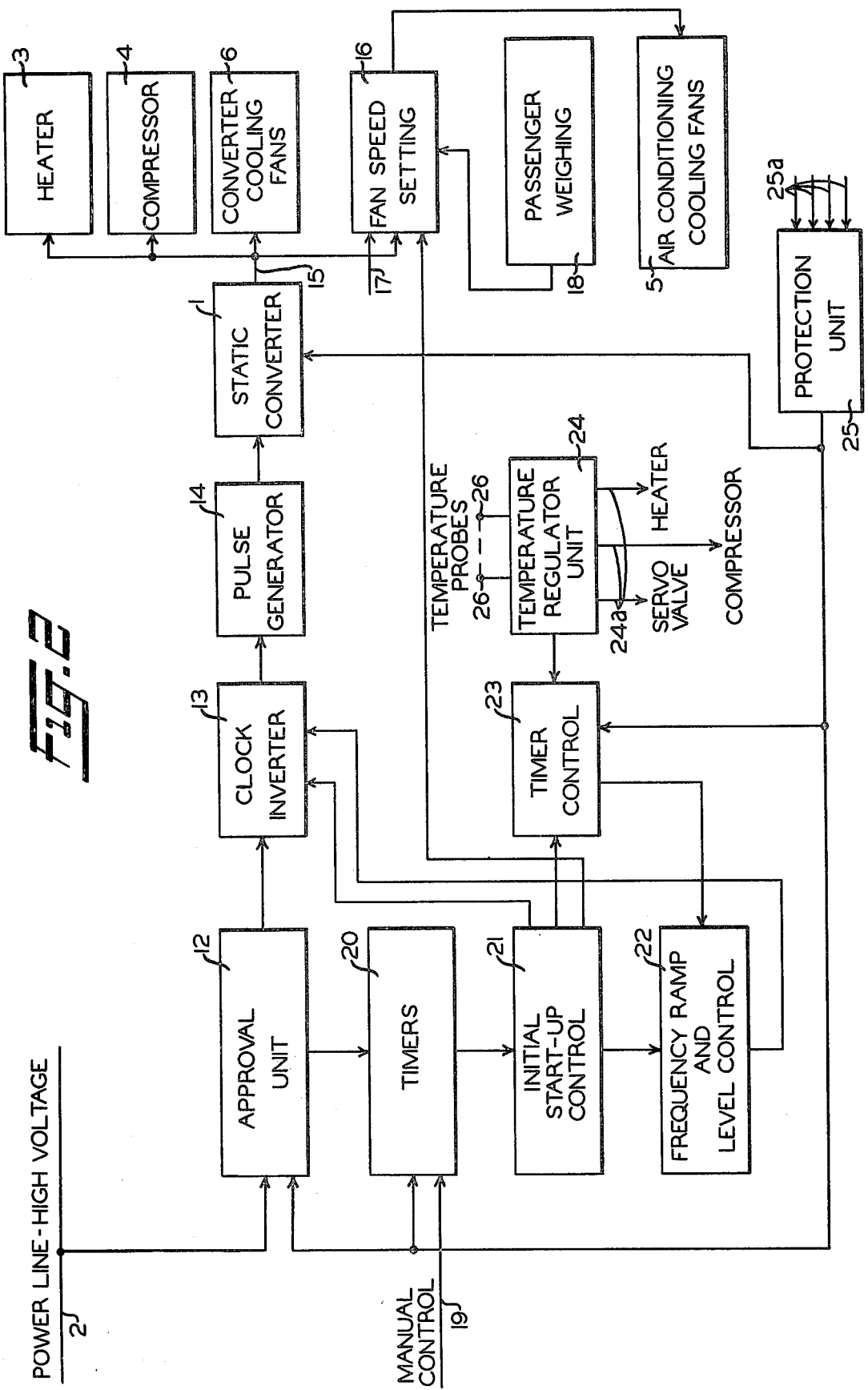
FIG. 2 shows a block diagram of the control system of the air conditioning unit.

The example of FIG. 2 shows in detail the structure of the control unit for an air-conditioning system wherein such a unit brings about the frequency variation of the alternating current supplied by the static converter.

The presence of power at high voltage line 2 is detected by an "approval" unit 12 to detect system start-up and accordingly initiate operation of the various system components. Thus, the unit 12 sends a signal to a "clock inverter" unit 13 which, through a sequence of soft starts, begins to oscillate and feeds pulse generators 14 with the same frequency. The pulse generators 14 act in a known manner upon the power stage of static converter 1, which as a result, begins to function at the imposed frequency. The power output 15 of converter 1 is connected with heater 3, motor compressor 4, fans 5 of the air-conditioning unit and fans 6 of converter 1. The connection with fans 5 of the air-conditioning unit is suitably made via a "fan speed switching" unit 16 installed for the purpose of providing some extra freedom when choosing the amount of ventilation. This unit, which is also provided with a manual control 17, is capable of changing the speed of fans 5 of the air-conditioning unit for a number of discrete levels, for example, by changing the polarity of the respective electric control motors. On approving start-up, "approval" unit 12 initiates operation of a number of timers 20 whose output is recorded by a "first-start control" device 21. The device 21 has the most important function of ensuring a complete sequence of the first start, even in the event of short interruptions in the high voltage supply at line 2, and in addition, of preventing subsequent complete first-start sequences from occurring prior to a predetermined period of time elapsing after completion of the start sequence proper.

The output of the timing devices 20 and the first-start control device 21 controls a "frequency ramp and level control" device 22 which has the function of forming the right frequency value which is, case by case, necessary for the operation of the system.

The "first-start control" device 21 actuates a further "overload-condition timing" device 23 which has the task of establishing the duration of this condition, determining the interruption thereof, via the "frequency ramp and level control" device 22, whether this interruption is requested on account of completion of the cycle, or because of the intervention of a "temperature-regulating" device 24 or on account of the intervention of a "protection" unit 25.

The temperature regulator 24 senses, by means of temperature probes 26 disposed within the vehicle, the thermal operating conditions of the vehicle and, through the outputs 24a, influences the compressor 4, a recycle servovalve (not shown) which controls the amount of outside air taken in by the installation between zero and a maximum value, and the heater 3, as well as the "overload-condition timing" device 23.

The protection unit 25 comprises all the safeguards of the system, which are operative in the various critical sensing areas, as a function of a series of information units which reach it via inputs 25a, and the most important of which are temperature, cooling fluid pressure, voltage, and current. There is also provided a manually initiated input 19 of the "timer" 20 so as to be able to bring about artifically a complete hight-power cycle, in order to deal with possible overcrowding of the coach.

A "weighing device" 18 of the vehicle, adapted to detect the presence of passengers above a certain limit, influences the "fan-output switching" device 16 in order to increase the ventilation in case of overcrowding.

Figure 3:
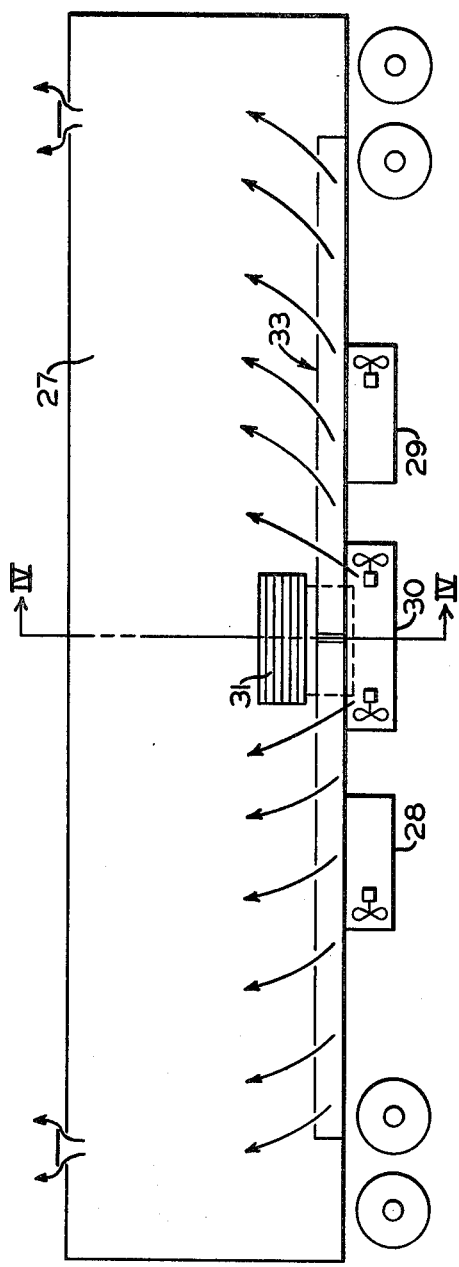
FIG. 3 shows an application of the unit of FIG. 1 in a railway vehicle.
Figure 4:
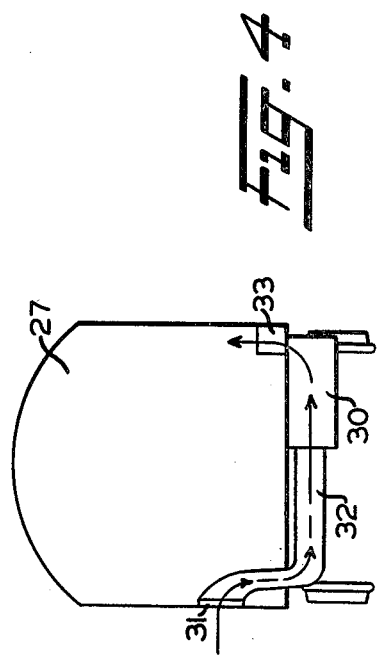
FIG. 4 shows a sectional view taken along lines IV—IV of FIG. 3.

The example in FIGS. 3 and 4 shows the structure of the air-conditioning installation as used on a railroad coach 27.

Two boxes 28, 29 located underneath the floor of the coach contain, respectively, the high voltage section and the low voltage section of a static converter and the respective electric fans. The numeral 30 indicates a box also located underneath the floor of the vehicle and containing the air-conditioning unit of the present system. Via a conduit 32, air is fed to box 30 from an outside air intake 31 located in the lower part of the coach and, after having been treated, is distributed in the vehicle through a longitudinal duct system 33 located at the floor level.

The example in FIGS. 5 and 6 shows the structure of an air-conditioning installation as used on a railroad coach 27, which is a modified embodiment of FIGS. 3 and 4 and which makes it possible to take maximum advantage of the possibilities offered by the present invention.

The structure shown in FIGS. 5 and 6 comprises a longitudinal duct system, preferably subdivided into two sections 34, 35, at the level of the floor within a vehicle 27, and a duct system 36 housed in the roof of the vehicle, a first air intake 37 associated with the duct 36 and a second air intake 38 located in the lower part of the vehicle. The two sections 28, 29 of the static converter are contained within two conduits 39, 40 which connect the air intake 38 with, respectively, the section 34 and the section 35 of the lower duct system. Each conduit 39, 40 contains, at its end turned towards the respective duct, a section 41, 42 of the heater. The conduits 39, 40 are disposed underneath the floor; in the same area there is mounted the "compressor" group 43 which contains the motor compressor and the condenser. On the other hand, the evaporator 44 is installed in the roof of the vehicle in the vicinity of the intake 37.

The wash rooms are each provided with an exhauster 45, 46 for air ventilation.

The operation of the system described above is as follows:

COOLING (FIG. 5)

The air taken from the outside through the intake 37 passes through the evaporator 44 where it is cooled and then distributed through the duct system 36 by means of the "dropdown" method. The air is recaptured through the ducts 34, 35 and passes into the conduits 39 and 40, thus cooling the converter 28, 29 after which it is exhausted via the intake 38.

HEATING (FIG. 6)

The air taken from the outside via the intake 38 passes through the sections 28 and 29 of the converter where it stores the heat losses of the converter, is subsequently heated by means of the heaters 41 and 42 and is then distributed in the vehicle via the duct sections 34 and 35.

The main advantages are:
- air distribution according to optimum comfort principles;
- total recovery of the heat losses of the converter, with correspondingly less energy consumption in the heating phase;
- cooling of the converter, under summer conditions, by means of air having a temperature which is lower than that of the outside air: hence fewer losses, increased reliability and longer life of the equipment;
- possibility of alternate use of the air filters associated with the air intakes 37 and 38, with a lower average degree of fouling thereof. In particular, the filter of the intake 37 will treat less dirty air;
- the boxes of the two sections 28 and 29 of the static converter may form a substantial part of the air ducts, schematically represented by 38 and 39, underneath the floor of the vehicle.

Having now described the invention, what we claim as new and desire to secure by Letters Patent, is:

1. An air-conditioning system for a passenger-type railway vehicle having a high voltage line to which a source of external electric power is connected, said system comprising:
   (a) power supply means including a static converter to which the electric power at the high voltage line is connected for providing alternating current having predetermined nominal values of frequency and voltage;
   (b) an air-conditioning unit operative during a normal mode of operation responsive to said predetermined nominal values of frequency and voltage to maintain the interior temperature of said vehicle within a comfort zone, said unit including:
      (i) an air duct via which outside air is distributed within said vehicle;
      (ii) a cooling unit including a motor-driven compressor, an evaporator in said air duct, and a condenser;
      (iii) a heating unit consisting of electrical heating elements in said air duct;
      (iv) a plurality of electric circulating fans for forcing the air in said duct over said evaporator and said heating elements; and
      (v) a plurality of electric cooling fans for providing a flow of air to cool said condenser, said cooling fans, said circulating fans, said motor-driven compressor, and said heating unit being operative responsive to the supply of said alternating current by said static converter; and
   (c) regulating means for selectively connecting either said motor-driven compressor or said heating elements to said supply of alternating current by said static converter depending upon the existing temperature within said vehicle being above or below said comfort zone, respectively; and
   (d) control means for varying said predetermined nominal frequency and voltage in order to operate said cooling fans, said circulating fans, said motor-driven compressor, and said heating unit during an abnormal service mode of operation of said vehicle, such as to rapidly bring the temperature level of said vehicle within said comfort zone; and
   (e) said control means including means for sensing an initial start-up of said vehicle in order to establish said abnormal mode of operation provided said regulating means detects the temperature within the vehicle as deviating from said comfort Zone.

2. An air-conditioning system as recited in claim 1, wherein said regulating means includes a plurality of temperature probes located throughout said vehicle, in response to which said regulating means detects a deviation of the temperature within said vehicle with respect to said comfort zone.

3. An air-conditioning system as recited in claim 1, wherein said control means further includes abnormal mode timer means enabled responsive to operation of said start-up sensing means for establishing a predetermined time period during which said control means is enabled to effect operation of said air-conditioning system in said abnormal service mode of said vehicle.

4. An air-conditioning system as recited in claim 3, further characterized in that said abnormal mode timer means is operative to disable said control means prior to expiration of said predetermined time period in response to said regulating means detecting the temperature of the vehicle as being within said comfort zone.

5. An air-conditioning system as recited in claim 4, further comprising protection means operative responsive to feedback signals representative of preselected critical operating conditions of said system for disabling said control means.

6. An air-conditioning system as recited in claim 1, wherein said control means further includes time delay means for preventing said start-up sensing means from establishing said abnormal service mode of operation of said vehicle until a predetermined time period expires subsequent to a previous initial start-up being sensed.

7. An air-conditioning system as recited in claim 6, wherein said control means further includes means for manually enabling said control means in parallel with said start-up sensing means.

8. An air-conditioning system as recited in claim 1, further comprising auxiliary control means operative responsive to said control means for varying the speed of said cooling fans in a predetermined number of discreet levels.

9. An air-conditioning system as recited in claim 8, further comprising vehicle load responsive means for detecting the number of passengers aboard said vehicle in excess of a predetermined number and for setting said auxiliary control means accordingly to establish the proper speed level of said cooling fans.

10. An air-conditioning system as recited in claim 3, wherein said start-up sensing means is operative responsive to the presence of power at said high voltage line for conditioning said control means to effect operation of said air-conditioning unit in said abnormal service mode of operation.

11. An air-conditioning system as recited in claim 10, comprising:
   (a) said power supply means including,
      (i) input means for producing a pulse waveform having a frequency corresponding to said predetermined frequency so long as power is present at said high voltage line of said vehicle;
      (ii) said static converter being operative in said normal service mode to provide said alternating current at said predetermined frequency imposed by said input means; and
   (b) said control means further including frequency control means operative during an initial start-up of said vehicle when the interior temperature of said vehicle deviates from said comfort zone for influencing said input means such as to adjust said predetermined frequency of said alternating voltage provided by said static converter during said abnormal service mode to effect operation of said air-conditioning unit.

12. An air-conditioning system as recited in claim 1, further comprising:
   (a) said air duct including:
      (i) two conduits located under the floor of said vehicle one end of each said conduit terminating at a first air inlet located along the lower side of said vehicle;
      (ii) a first longitudinal duct located along the floor of said vehicle via which heated air is distributed to the interior of said vehicle when said air-conditioning unit is operating, said longitudinal duct receiving the end of each said conduit opposite said one end thereof;
   (b) said static converter having two sections, each of which is located in a respective one of said two conduits; and
   (c) said heater unit being subdivided to provide at least one of said heating elements in each said conduit downstream of said section of said static converter therein, whereby the air forced by said circulating fans to pass from the inlet over said heating elements is preheated by first passing over a respective one of said sections of said static converter.

13. An air-conditioning system as recited in claim 12, further comprising:
   (a) a second air inlet located along the upper side of said vehicle;
   (b) a second longitudinal duct located along the ceiling of said vehicle to which said second air inlet is connected;
   (c) said evaporator of said cooling unit being disposed in said longitudinal duct such that when said air-conditioning unit is operating, cooled air forced from said second longitudinal duct into the interior of said vehicle by said circulating fans being gravity-forced into said first duct and discharged to the outside of said vehicle via said first air inlet so as to cool said two sections of said static converter as the air passes through said two conduits.

* * * * *